H. DUCSH.
Bushing for Fire-Tubes and Flues of Steam Boilers.

No. 167,157. Patented Aug. 31, 1875.

Witnesses:
J. P. Theodore Laney
J. A. Campbell

Inventor:
Henry Ducsh
by
Mason, Fenwick & Lawrence
Attys

UNITED STATES PATENT OFFICE.

HENRY DUCSH, OF BALTIMORE, MARYLAND.

IMPROVEMENT IN BUSHINGS FOR FIRE TUBES AND FLUES OF STEAM-BOILERS.

Specification forming part of Letters Patent No. 167,157, dated August 31, 1875; application filed July 14, 1875.

*To all whom it may concern:*

Be it known that I, HENRY DUCSH, of the city and county of Baltimore and State of Maryland, have invented an Improved Bushing for Fire Tubes and Flues of Steam-Boilers; and I do hereby declare that the following is a full, clear, and exact description thereof, reference being had to the accompanying drawings making part of this specification, in which—

Figure 1:
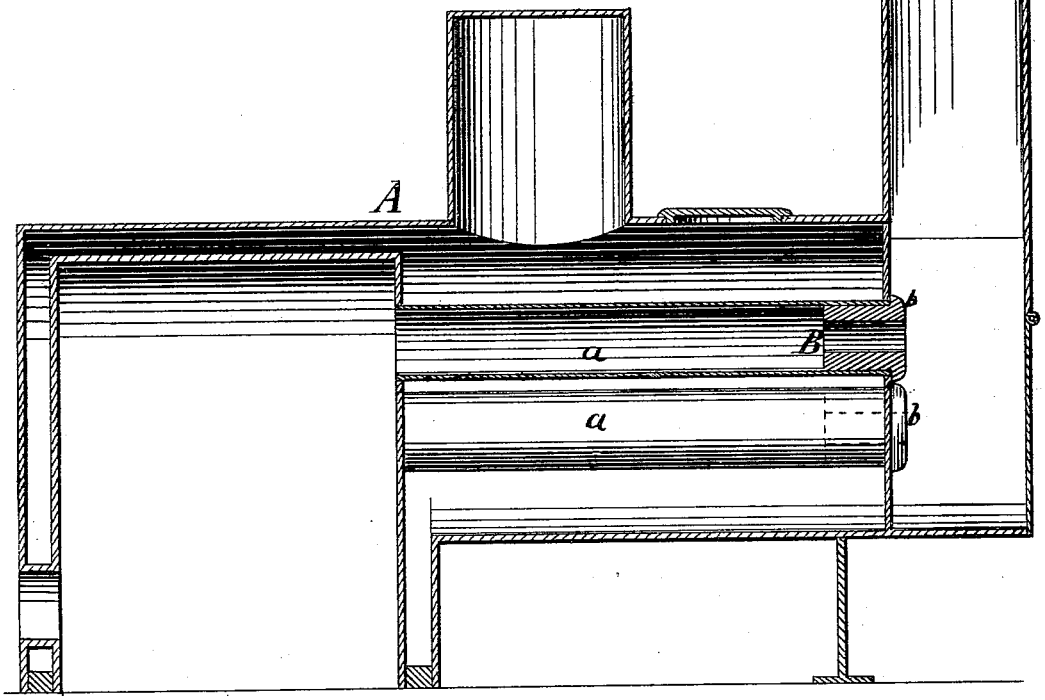
Figure 2:
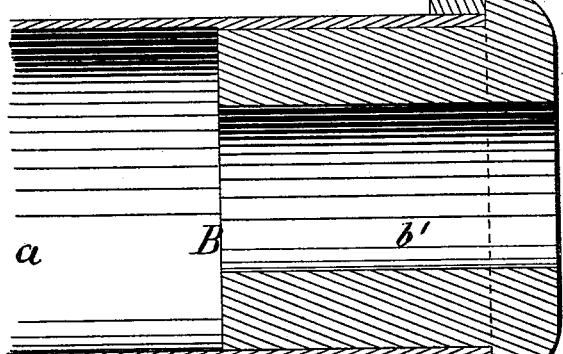
Figure 3:
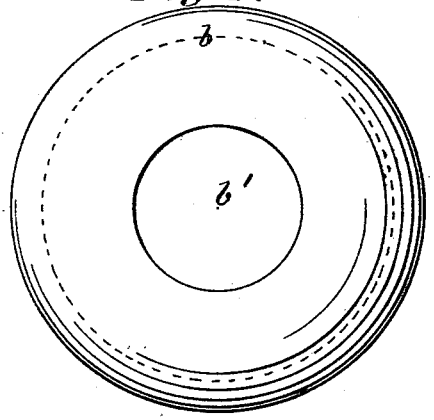

Figure 1 represents a vertical longitudinal section of a steam-boiler having my invention applied to the flues; Fig. 2, a section of the end of a flue with a bushing inserted, both drawn on a larger scale; and Fig. 3, an end view of the said bushing.

My invention relates to end-bushing of boiler-flues. It consists of a bushing with a flange made of burnt clay or other similar refractory substance, having an opening of small diameter for the egress of air and products of combustion.

The object of my invention is to contract the diameter of the tube at the end to such a degree as to concentrate the heat therein, retard the velocity of draft, and by this means perfect the combustion of all such combustible gases and materials as are usually carried through the ordinary flues and lost, and while this is accomplished avoid destruction by intense heat of the bushing and injury to the flues by undue expansion of the bushings when highly heated.

A represents a boiler with flues $a$, which are provided at their ends with the bushings B. The said bushings are provided with flanges $b$, by which they overlap and cover the ends of the flues and a part of the flue-plate C. The holes $b'$ of the said flues are of considerably smaller diameter than those of the flues, and are very smooth, so as to afford a very easy passage of the non-combustible gases.

It is a well-known fact that the amount of combustible material lost by excessive draft in locomotives is very great, and therefore many efforts have been made to avoid this loss in various ways. The most effective means heretofore employed consists of an additional combustion-chamber. This plan, however, requires an entire change of the inner parts of a boiler, and is also very expensive.

I propose, by contracting the area of a flue at its end, to make such flue a small combustion-chamber, and, by making the bushings fire-proof, and furnishing all the flues with them, a very effective substitute for the combustion-chamber proper is provided at a very little cost.

Under my plan of construction the draft has a surplus expansion area nearly the entire length of the flue, and its force near the end thereof is partly checked by the bushing, consequently the heat and fire have time to ignite the combustible gases and inflammable matters before they escape through the bushings. The heat thus saved within the flues creates a greater amount of steam and power, and consequently a saving of fuel is effected. The greater amount of heated gases within the flue passing through the hole $b'$ would expand a metal bushing so much as to injure the flue and flue-plate and cause leakage. The dry oxidation of such bushing would also greatly be favored by excessive heat, and therefore metal bushings are not deemed practicable. Bushings made of fire-clay or other analogous refractory material are immaterially affected in the above-described manner, and are the best for that reason.

The flange $b$ covers and protects the end of the flue and a part of the surrounding flue-plate against the damaging influence of the fire and hot gases passing through the hole $b'$, and also prevents the leaking of fire or hot gases between the flue and bushing.

I am aware that a tube has been contracted by inserting flanged metal plugs into the end of the same, for the purpose of promoting combustion and increasing the effectiveness of a given amount of fuel; but I am not aware that the flues of a steam-boiler have ever been constructed with a contracted passage, and at the same time partly of metal and partly of burnt clay or other material, which is of a refractory character, and not liable to expand under very intense heat. Therefore, while I do not claim a flue contracted at its exit by means of metal plugs,

What I claim as my invention is—

A steam-boiler tube, constructed with one portion of its length of light tubular metal, and the other portion of heavy burnt clay, the burnt clay portion being constructed with a bore, which is of smaller diameter than the metal portion of the tube, and inserted into the discharge or after end of the metal portion a short distance, and supported upon the flue-sheet, and kept from longitudinal movement by a flange formed upon the clay portion of the tube, all in the manner and for the purpose herein described.

HENRY DUCSH.

Witnesses:
WM. POLE,
NAT. H. HABLE,
EDWD. G. STARR.